Patented May 12, 1953

2,638,432

UNITED STATES PATENT OFFICE 2,638,432

PARA-NITRO-PHENYL-ARSONIC ACID BLACKHEAD CONTROL COMPOSITION

Neal F. Morehouse and Willis C. McGuire, Charles City, Iowa, assignors to Dr. Salsbury's Laboratories, a corporation of Iowa No Drawing. Application November 18, 1950, Serial No. 196,516

2 Claims. (Cl. 167—53.1)

This invention relates to veterinary preparations, and more particularly to a therapeutic treatment and composition for the prevention and control of blackhead in poultry.

Blackhead is a gastro-intestinal disease of protozoal origin. It occurs predominantly in young turkeys between three weeks and two to three months, but it may also affect older birds and a wide variety of other avian species, such as chicken, guinea, quail, pheasant and pea-fowl. To the veterinarian it is known as Histomoniasis and infectious enterohepatitis, meaning an infectious inflammation of the ceca and the liver. The cause of the disorder is a microscopic flagellate protozoon known as *Histomonas meleagridis*. The infecting parasite moves by means of whip-like structures called flagella, but under certain conditions may change to an amoeboid form. When unprotected, the organism is very sensitive to sunlight and dryness and, in this state, can hardly survive for more than twenty-four hours at room temperature. The parasite, however, is mostly harbored by the common poultry cecal worm, *Heterakis gallinae*, and its eggs wherein it is capable of living for long periods of time. It is mainly this source of infection that is responsible for the transmission of the disease.

Birds acquire blackhead either by consuming feed or water contaminated with droppings containing *Histomonas meleagridis*, or by eating cecal worms or cecal worm eggs, which are infected by the organism. One of the manifestations of the disease is a lowered head which sometimes becomes darkened, a symptom to which the disorder owes its common name. But this symptom is not characteristics of blackhead alone. More significant signs of the infection including drooping of the wings, drowsiness, ruffled feathers, dullness, loss of appetite, a constant yellowish or sulfur-colored diarrhea and a slight lowering of temperature. As a rule young poults are susceptible to a rapid onset and short course of the disease, and may die soon after the appearance of the first symptoms. Adult birds are usually sick for several days before dying and show excessive wasting of flesh. A post-mortem examination exposes multiple ulcerations and lesions of the cecal wall and the liver. A sticky fluid seeps from the thickened cecal wall, forming yellowish-green cores in the ceca. It has a disagreeable, putrid odor which is the result of the tissue destruction. The lesions of the liver consist of irregular, reddened, or gray spots to large necrotic areas. In advanced cases, the peritoneum and mesenteric tissues regularly become involved.

The prognosis of the disease, especially in turkeys, is most unfavorable. The mortality is high and sometimes attains 100 per cent of the flock unless stringent control measures are applied. The heaviest losses occur during the first three months of life, but may occur at other ages. Very frequently an outbreak is observed during the breeding season. In view of its epidemic character and widespread distribution, blackhead is a serious problem to the turkey raising industry and even has, at times, caused the temporary abandonment of this branch of poultry husbandry in some sections of eastern and midwestern United States.

The principal effective methods so far known for the prevention and control of infectious enterohepatitis are confined to proper sanitation and management, and the removal of the cecal worm, *Heterakis gallinae*, which is the host of the infecting parasite and therefore one of the main sources of infection. However helpful and valuable these measures may be, they have their definite limitations, both in respect to their effectiveness, and to the expenditure in labor, equipment, and materials, incurred by sanitary measures. They include such elaborate and burdensome steps as brooding in special enclosures which have no contact with the soil, raising the poults on clean ground separately from other turkeys and chickens, special equipment for feeding and watering secure from fecal contamination, and quarantining new stock for three weeks before incorporating it into the flock. The preventive treatment with anthelmintics, in spite of claimed successes, has likewise its serious drawbacks. Its action is limited to the control of the cecal worm harboring the parasite; but it has no effect upon the transmission of the disease by fecal material, and by direct contact of the birds such as would occur on a heavily infected ground. Moreover, the administration of certain wormers, like phenothiazine, is often downright contraindicated, as in the case where the presence of the disease and attendant hepatic lesions must be suspected in birds that have been in contact with infected individuals.

Various therapeutic substances have been tested with a view to curing and controlling infectious enterohepatitis which may be considered as the disease problem number one in the turkey industry. But no drug or formulation has so far been found entirely adequate to check the epidemic losses of this ravaging disease.

It is, therefore, an object of the present invention to devise an improved therapeutic agent for the treatment and control of blackhead in poultry, and especially in turkeys, which will prevent the spread of the disease when administered upon the appearance of the first signs of the infection in the flock.

It is another object of the invention to provide for a veterinary drug against blackhead which may be easily administered in water or feed, is palatable to the bird, and is not toxic when used in effective concentrations.

Still another object of this invention is to obtain a therepeutically active substance for the prevention and control of infectious enterohepatitis in chickens and turkeys which will prevent the development of clinical lesions in the exposed bird.

Yet another object of the invention is to provide a medicinal preparation for the treatment of poultry, which will stimulate the natural growth and development of the birds, so that they reach the stage of maturity within a shorter time than under ordinary conditions.

Other objects and advantages of the invention will become apparent from the following description which is intended to be illustrative, and not limitative, in scope.

We have discovered that para-nitro-phenyl-arsonic acid may be administered by oral ingestion in certain concentrations to birds, and particularly to turkeys, so as to effect a therapeutic control of blackhead in the stage of initial infection, and to provide added growth benefits over ordinary growth rates. The dosages applied lie within ranges which are essentially non-toxic, and do enhance the natural growth and development of the bird, without impairing the regular performance of its physiological functions. The new remedy may, therefore, be given with perfect safety and for prolonged periods of time, due to its high potency and low toxicity which qualifies it as markedly superior to other types of arsenicals with a decidedly lower therapeutic index.

The compound within the purview of this invention is a benzene-arsonic acid in which the 4-position is occupied by a nitro group $NO_2$. It may be represented by the following formula:

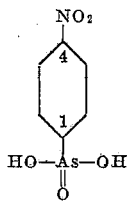

In chemical terminology, it is commonly known as para-nitro-phenyl-arsonic acid, or 4-nitro-phenyl-arsonic acid. While the description and following examples specifically illustrate the acid for the purpose of this disclosure, it will be clearly understood that its water-soluble salts are likewise included within the scope of the invention, and that they shall be covered by the claims as obvious equivalents. Salts of the type as described comprise those of the alkali metals, ammonium, alkaline earth metals, such as calcium and barium, and further copper, iron and cobalt. Examples of such salt compounds are:

Sodium-para-nitro-phenyl-arsonate
Potassium-para-nitro-phenyl-arsonate
Ammonium-para-nitro-phenyl-arsonate
Calcium-para-nitro-phenyl-arsonate
Copper-para-nitro-phenyl-arsonate
Iron-para-nitro-phenyl-arsonate
Tin-para-nitro-phenyl-arsonate The equivalence of these salts is predicated upon the probability that the pharmacological activity of these compounds may, at least in part, be traceable to the anion of para-nitro-phenyl-arsonic acid. But it is not intended that the scope of the invention be restricted to this particular theory or explanation. In principle, therefore, the scope of this invention embraces the para-nitro-phenyl-arsonic acid and all of its salts which may be effectively utilized to attain the desired therapeutic effects in the control of blackhead, including those cations which are not excessively toxic within the useful dosages to be applied.

As previously stated, the drug is desirably administered in any medium, carrier or vehicle which is susceptible of being orally ingested by the bird. Preferred are nutritive materials which are absorbed or taken into the body of the treated bird, and serve for the purposes of growth, work, repair, and for the maintenance of the vital processes. These substances may be of inorganic or organic origin or nature. They may consist of feed, such as wet mash grain, dry mash grain, mixed mash and all mash; or they may include drinking water, distilled or undistilled, free from or added with accessory factors and supplemental medication.

EXAMPLE 1

Sixteen Broad Breasted Bronze turkey poults were reared in wire-bottomed cages in brooding rooms. When these poults were about six-weeks-of-age, they were placed in individual cages, having hardware cloth bottoms, where they remained for two or three days. This period in the individual cages allowed the poults to become accustomed to their new quarters before the tests were started. The sixteen poults were thereupon divided into four groups of four birds each, and infected by administration of embryonated eggs of the cecal worm of chickens, *Heterakis gallinae*. Approximately two hundred and fifty eggs per bird per day were given for three successive days. Two of the groups were placed under medication, while the two remaining groups served as controls. The experimental period was divided into three portions, the medication time of usually twenty-one days, a first post-medication period of ten days, and a second post-medication period of twenty days. During the first post-medication period of ten days, the poults were kept in the individual cages; during the second post-medication period of twenty days, the poults were moved into group batteries or quartered into a clean brooder house.

One of the groups was placed under medication with para-nitro-phenyl-arsonic acid at a dosage of 1.5 grams per gallon of drinking water corresponding to 0.0396%; the second group received 1.2 grams of the compound per gallon of water or 0.0317%. Medication was started three days before infection and was continued for twenty-one days, during which time the birds were permitted to freely imbibe the drinking solution. The two control groups received unmedicated water.

None of the birds receiving 1.5 grams of the acid per gallon died during the medication period; while three birds of the untreated control group were lost during the same time. After an additional ten days concluding the first post-medication period, all the treated birds were still alive; and only one bird of that group was lost, due to injury and not to blackhead, upon the completion of the test thirty days after medication. The final result, therefore, showed a 100% survival in the treated, and only 25% survival in the untreated group.

None of the birds receiving 1.2 grams of the compound per gallon of water died during medication, while three unmedicated birds succumbed as a result of the disease. At the end of the second post-medication period, two of the treated birds were lost, which shows a 50% survival for the medicated group, compared to a 25% survival of the control group.

EXAMPLE 2

Eight Broad Breasted Bronze turkey poults were reared and treated as illustrated in the foregoing example, and divided into two equal groups, one of which received 1.0 gram of para-nitro-phenyl-arsonic acid per gallon of drinking water (0.0264%), while the other group remained as unmedicated controls. Ten days after the medication period all of the controls were dead of blackhead, while all of the tested birds survived. Thirty days after the medication period three of the four treated birds survived while all of the unmedicated birds had died of blackhead.

EXAMPLE 3

Eight Broad Breasted Bronze breed turkey poults were reared and infected as in Example 1, and divided into two groups of four birds each, the second group serving as control. The test group was medicated with 0.75 gram of the acid per gallon of water, corresponding to a concentration of 0.0198%. Thirty days after discontinuance of medication all four of the treated birds were alive, while three of the controls were lost.

EXAMPLE 4

Eight Broad Breasted Bronze breed turkey poults were divided into two groups of four birds each, and one group was treated with the arsenical at a dosage of 0.60 gram per gallon of water (0.0158%). All four birds survived the experiment upon the conclusion of the second post-medication period, while three of the untreated poults had died.

EXAMPLE 5

Nine Broad Breasted Bronze breed turkeys, prepared for the test as illustrated above, were divided into two groups of five treated birds and four control birds. One of the groups was placed under medication with 0.50 gram of the compound per gallon of water (0.0132%). At the end of the experiment, two of the medicated birds had died, while three were lost in the control group.

Numerous additional determinations on the basis of the foregoing five examples have resulted in the finding, that the optimum efficacy of para-nitro-phenyl-arsonic acid lies within the concentrations of about 0.5 gram and 1.5 grams per gallon of drinking water, or expressed in percentages within approximately 0.0132% and 0.0396%. While higher dosages, in the neighborhood of 2.0 grams per gallon or 0.0528%, have been found rather toxic, especially for younger birds; concentrations below 0.25 gram or 0.0066% are of insufficient potency in helping the poults survive exposure to blackhead infection. For practical purposes 0.6 gram, or 0.0158%, of the remedy are preferably administered to poults under eight-weeks old; and 0.8 gram, corresponding to 0.0210%, is recommended as the optimum dosage for turkeys older than two months. These figures, however, are given only as a preferred embodiment of our invention; and it will be readily understood that they may be subject to biological variations due to the particular breed of the medicated birds, to their state of health, to their climatic conditions, and to the intensity of exposure to infection.

As for medication in feed, the following experimental data are presented to show the effective concentration ranges within which prophylactic control and prevention of relapses were attained:

EXAMPLE 6

All the birds listed in the table on the following page were reared and prepared for test as described in Example 1. Concentrations varied from 0.0125% to 0.2%, and treatment was carried out with the results given in the following table.

Tabulation showing the number of survivals in poults receiving varying concentrations of ptra-nitro-phenyl-arsonic acid in the feed

| Percent Dosage of Arsonic Acid | Number of Poults | | Periods of Observation | | | | | |
|---|---|---|---|---|---|---|---|---|
| | | | Medication Period | | Medication Period +10 Days | | Medication Period +30 Days | |
| | Treated | Controls | T[1] | IC[2] | T | IC | T | IC |
| 0.2000 | 4 | 4 | 0 | 2 | 0 | 2 | 0 | 2 |
| 0.1500 | 4 | 4 | 1 | 2 | 1 | 2 | 1 | 2 |
| 0.1000 | 4 | 4 | 4 | 2 | 4 | 2 | 4 | 2 |
| 0.0750 | 4 | 4 | 4 | 2 | 4 | 2 | 4 | 2 |
| 0.0750 | 4 | 4 | 4 | 2 | 4 | 0 | 4 | 0 |
| 0.0600 | 4 | 4 | 4 | 2 | 4 | 0 | 4 | 0 |
| 0.0500 | 4 | 4 | 4 | 2 | 4 | 0 | 3 | 0 |
| 0.0250 | 4 | 4 | 4 | 2 | 4 | 2 | 3 | 1 |
| 0.0125 | 4 | 4 | 4 | 2 | 4 | 2 | 3 | 2 |
| 0.0075 | 4 | 4 | 4 | 2 | 3 | 2 | 2 | 2 |
| 0.0050 | 4 | 4 | 1 | 2 | 1 | 2 | 1 | 2 |
| 0.0025 | 4 | 4 | 1 | 2 | 0 | 2 | 0 | 2 |
| 0.0010 | 4 | 4 | 1 | 2 | 1 | 2 | 1 | 2 |

[1] Treated (Infected-Medicated.)
[2] Infected Controls (Infected-Unmedicated.)

The above figures show that poults which received 0.15% and 0.2% of the acid in the feed died of toxicity, while birds receiving 0.075% and 0.1% survived. Feed concentrations between 0.001 and 0.005% proved ineffective for preventing blackhead infection; whereas, dosages between 0.0075% to 0.1% were 100% effective in checking mortality from the disease while medication was continued. Survival at the tenth post-medication day was complete in those poults which received concentrations of 0.0125% to 0.1%. Survival at the thirtieth post-medication day of the birds that received the same dosage was 89.3%, as compared to only 25% survival in the unmedicated-infected control group. It may thus be seen that the preferred medication in feed lies within the range of 0.0125% to 0.1%.

During all the experiments, weight, feed-, and water-consumption records were kept on each poult under test. While it was generally found that some higher dosages exceeding about 0.1% in the feed, and 0.05% in the water, had detrimental effect upon natural growth and weight increase, no such inhibitive action was observed at the lower levels, as illustrated by the examples. While testing the lower therapeutic and sub-therapeutic levels for their physiological activities, we made on the contrary the surprising discovery that growth was considerably enhanced in the treated birds, as compared with the controls. This was strikingly apparent from the weight records from which the ratios of increases of the medicated and unmedicated poults were calculated in the following manner. If, for instance, the average gain for a group of treated birds was found to be 675.1 grams, and the gain of the control was 453.2 grams, the ratio of these two figures, multiplied by 100, will represent the percentages of weight gains attained by the medicated group as compared with the controls, or:

$$\frac{675.1}{453.2} \times 100 = 148.9\%$$

EXAMPLE 7

Sixty turkey poults were divided into two groups of thirty birds each. One group received 0.200 gram of para-nitro-phenyl-arsonic acid per gallon of water, or 0.00528%; and the other group received 0.400 gram of the same compound, corresponding to 0.0106%. They were kept under this medication for five weeks while a control group of thirty birds remained untreated. The ratio of gains of the treated to the untreated turkeys was 149% for the first and 142.3% for the second group.

EXAMPLE 8

One hundred and twenty young turkeys were divided into four groups of thirty birds each. Each of them received for a period of four weeks a feed ration enriched respectively with 0.0312%, 0.0132%, 0.0264% and 0.0066% of the compound; while two control groups of thirty birds each remained on unmedicated diet. As a result, the respective weight gain ratios were 134.5%, 149.5%, 130.4% and 124.9%.

EXAMPLE 9

Fifty young turkeys were divided into two groups of twenty-five birds each. Each of the birds received for the period of five weeks, a drinking water solution containing 0.100 gram per gallon of water = 0.00264%, while the control group remained unmedicated. The ratio of gain of the treated to the untreated turkeys was 110.4%.

EXAMPLE 10

Sixty-eight young turkeys were divided into two groups of 34 birds each. One of the groups received for a period of four weeks a feed ration enriched with 0.0375% of para-nitro-phenly-arsonic acid while the control group remained on unmedicated diet. The weight gain ratio of the medicated group was 110% as compared with the unmedicated birds.

These figures demonstrate that para-nitro-phenyl-arsonic acid has a definite growth promotion effect upon young turkey poults in concentrations which lie within an area of approximately 0.00264% to 0.0106% for drinking water, and of about 0.006% to 0.03% for feed. It will, however, be understood that these figures are not limitative, but are rather subject to variations depending upon the bodily condition of the bird and its environmental circumstances. In this manner, of course, there are overlapping ranges within which the compound simultaneously develops both a therapeutic and a tonic action of limited extent.

It should be noted that para-nitro-phenyl-arsonic acid and its salts are entirely efficient when used alone, either as a remedy against blackhead, or as a growth promotion factor. For field purposes, however, it is frequently desirable to compound these substances in formulations, such as those illustrated in the following examples:

EXAMPLE 11

A tablet of 1.100 grams (17 grains), contains the following ingredients:

| | Grams |
|---|---|
| Para-nitro-phenyl-arsonic acid | 0.200 |
| Ammonium phenolsulphonate | 0.384 |
| Sodium phenolsulphonate | 0.384 |
| Boric acid | 0.132 |
| Total | 1.100 |

The phenolsulphonates are used in this formulation as binders to assure ready dissolution in water. Boric acid serves as a lubricant to facilitate the punching of the tablet.

EXAMPLE 12

A powder composition for incorporation in feed is composed as follows:

| | Per cent |
|---|---|
| Para-nitro-phenyl-arsonic acid | 25 |
| Kaolin | 75 |
| Total | 100 |

The kaolin in this formulation is used as a bulking agent in order to permit a uniform and homogenous distribution of the arsenical in the feed mixture. It is evident that various other binders, such as starch, sucrose, gelatin, gum acacia, corn syrup and their equivalents may be advantageously used in making the compressed tablets, and that lubricating materials other than boric acid may be employed to prevent the sticking of the tablets. Such ingredients are hydrogenated vegetable oil, stearic acid and their alkali and earth alkali salts, white mineral oil and talc. Likewise, the powder preparation may contain other inactive bulking agents instead of kaolin, such as bentonite, talcum, and similar suitable silicates, starch, soybean meal, or other therapeutically inert matter.

A dosage of three tablets per gallon of water, as illustrated in Example 9, amounts to 0.600 gram or 0.0158%; and will prevent the spread of blackhead in turkey flocks under eight-weeks old when administered at the first sign of the disease. For older birds, four of these tablets, containing 0.800 gram and representing a concentration of 0.0211%, are given with the same effect.

A preferred dose of one pound of powder composition (see Example 10), in every 1000 pounds of an all mash ration is a suitable feed mixture containing about 0.025% of the active ingredient. To secure an even distribution, the powder is compounded with a small amount of mash as a pre-mix which is then blended into the bulk of the feed with thorough mixing.

As previously stated, the therapeutic substance may also be administered in various other combinations adapted for oral ingestion, such as special diets or rations consisting of proteins, fats, oils, carbohydrates, or mineral materials, gelatine, yeast, brans, grains and fibrous matter. The medicament may be incorporated therein in any desired strength to suit the purpose in view, and it shall be clearly understood that all and any of these forms of medication are included within the scope of the claims by way of equivalence.

While the invention has been described in accordance with the preferred embodiments, it is apparent that many variations and modifications may be resorted to without departing from the scope of equivalents within the purview and spirit of this invention as defined in the following claims.

We claim:

1. A composition for the control of blackhead in poultry comprising in combination a poultry feed and a substance selected from the group consisting of para-nitro-phenyl-arsonic acid water soluble salts of para-nitro-phenyl arsonic acid and mixtures thereof in the approximate concentration of 0.0075% to 0.1%.

2. A composition for the control of blackhead in poultry comprising an aqueous solution containing a substance selected from the group consisting of para-nitro-phenyl-arsonic acid, water soluble salts of para-nitro-phenyl-arsonic acid, and mixtures thereof, in the approximate concentration of 0.0066% to 0.04%.

NEAL F. MOREHOUSE.
WILLIS C. McGUIRE.

References Cited in the file of this patent

UNITED STATES PATENTS

| Number | Name | Date |
|---|---|---|
| 2,450,866 | Morehouse | Oct. 5, 1948 |
| 2,531,756 | Waletzky | Nov. 28, 1950 |

OTHER REFERENCES

Harwood, Journal of the American Veterinary Medical Association, September 1940, volume 97, pages 248 to 253.

Bird, Journal of Nutrition, volume 37, pages 215 to 226 (1949).

Jacobs, Journal of the American Chemical Society, volume 40, page 1584 (1918).